(12) United States Patent
Perez et al.

(10) Patent No.: US 12,475,779 B2
(45) Date of Patent: *Nov. 18, 2025

(54) SYSTEM AND METHOD FOR FACILITATING APPLIANCE CONTROL VIA A SMART DEVICE

(71) Applicant: Universal Electronics Inc., Scottsdale, AZ (US)

(72) Inventors: Jesus Perez, Fontana, CA (US); Joven Jubilo, Anaheim, CA (US); Rex Xu, Tustin, CA (US); Jeffrey Kohanek, Westminster, CA (US); Brandt Thompson, Newport Coast, CA (US)

(73) Assignee: Universal Electronics Inc., Scottsdale, AZ (US)

(*) Notice: Subject to any disclaimer, the term of this patent is extended or adjusted under 35 U.S.C. 154(b) by 3 days.

This patent is subject to a terminal disclaimer.

(21) Appl. No.: 18/140,829

(22) Filed: Apr. 28, 2023

(65) Prior Publication Data

US 2023/0267825 A1  Aug. 24, 2023

Related U.S. Application Data

(63) Continuation of application No. 17/834,662, filed on Jun. 7, 2022, now Pat. No. 11,676,483, which is a
(Continued)

(51) Int. Cl.
  *G05B 11/01*  (2006.01)
  *G08C 17/02*  (2006.01)
  (Continued)

(52) U.S. Cl.
  CPC ............. *G08C 17/02* (2013.01); *G08C 23/04* (2013.01); *H04M 1/72415* (2021.01);
  (Continued)

(58) Field of Classification Search
  None
  See application file for complete search history.

(56) References Cited

U.S. PATENT DOCUMENTS

| 4,626,848 | A | 12/1986 | Ehlers |
| 4,703,359 | A | 10/1987 | Rumbolt |

(Continued)

FOREIGN PATENT DOCUMENTS

| CN | 103179208 A | 6/2013 |
| CN | 103685746 A | 3/2014 |
| CN | 101910960 A | 6/2014 |
| CN | 102541547 B | 12/2015 |
| CN | 103999137 A | 4/2017 |
| DE | 197098002 A1 | 9/1998 |
| EP | 0513443 B1 | 11/1999 |

(Continued)

OTHER PUBLICATIONS

"Data Formats for IR Remote Controls," Vishay Semiconductors, Document No. 80071, Rev. A2, {Aug. 27, 2003), 5 pp.
(Continued)

*Primary Examiner* — Curtis A Kuntz
*Assistant Examiner* — Jerold B Murphy
(74) *Attorney, Agent, or Firm* — Greenberg Traurig, LLP

(57) ABSTRACT

A bridge device, in communication with a smart device, functions to command one or more controllable appliances in response to communications received from the smart device. The bridge device also includes input elements by which the bridge device can be used to directly command common functional operations of the one or more controllable appliances. In this manner, common functional operations, such as volume control, playback pause/resume control, etc., may be made readily available without necessitating the use of the smart device, whilst the more sophisticated GUI provided by the smart device remote control app may be advantageously utilized when more complex or less frequently used command functions are to be performed.

18 Claims, 6 Drawing Sheets

Related U.S. Application Data continuation of application No. 17/126,731, filed on Dec. 18, 2020, now Pat. No. 11,398,148, which is a continuation of application No. 15/832,268, filed on Dec. 5, 2017, now Pat. No. 10,902,716, which is a continuation of application No. 13/071,661, filed on Mar. 25, 2011, now Pat. No. 9,852,615.

(51) Int. Cl.
　　*G08C 23/04*　　　(2006.01)
　　*H04L 12/28*　　　(2006.01)
　　*H04M 1/72415*　　(2021.01)
　　*H04N 5/44*　　　(2011.01)
　　*H04N 21/422*　　(2011.01)

(52) U.S. Cl.
　　CPC ..... *G08C 2201/40* (2013.01); *G08C 2201/92* (2013.01); *G08C 2201/93* (2013.01); *H04M 2250/22* (2013.01)

(56) References Cited

U.S. PATENT DOCUMENTS

| | | |
|---|---|---|
| 4,746,919 A | 5/1988 | Reitmeier |
| 4,959,810 A | 9/1990 | Darbee |
| 4,998,292 A | 3/1991 | Eigeldinger |
| 5,255,313 A | 10/1993 | Darbee |
| 5,341,166 A | 8/1994 | Garr |
| 5,410,326 A | 4/1995 | Goldstein |
| 5,452,291 A | 9/1995 | Eisenhandler |
| 5,481,256 A | 1/1996 | Darbee |
| 5,519,457 A | 5/1996 | Nishigaki |
| 5,537,104 A | 7/1996 | Van Dort |
| 5,552,917 A | 9/1996 | Darbee |
| 5,614,906 A | 3/1997 | Hayes |
| 5,689,663 A | 11/1997 | Williams |
| 5,726,645 A | 3/1998 | Kamon |
| 5,835,156 A | 11/1998 | Blonstein |
| 5,839,097 A | 11/1998 | Klausner |
| 5,889,506 A | 3/1999 | Lopresti |
| 5,909,183 A | 6/1999 | Borgstahl |
| 5,949,351 A | 9/1999 | Hahm |
| 5,959,539 A | 9/1999 | Adolph |
| 5,959,751 A | 9/1999 | Darbee |
| 5,990,884 A | 11/1999 | Douma |
| 6,005,490 A | 12/1999 | Higashihara |
| 6,008,735 A | 12/1999 | Chiloyan |
| 6,014,092 A | 1/2000 | Darbee |
| 6,097,441 A | 8/2000 | Allport |
| 6,127,961 A | 10/2000 | Stacy |
| 6,133,847 A | 10/2000 | Yang |
| 6,148,241 A | 11/2000 | Ludtke |
| 6,157,319 A | 12/2000 | Johns |
| 6,160,491 A | 12/2000 | Kitao |
| 6,177,931 B1 | 1/2001 | Alexander |
| 6,208,341 B1 | 3/2001 | Van Ee |
| 6,208,384 B1 | 3/2001 | Schultheiss |
| 6,211,870 B1 | 4/2001 | Foster |
| 6,259,892 B1 | 7/2001 | Helferich |
| 6,344,817 B1 | 2/2002 | Verzulli |
| 6,473,099 B1 | 10/2002 | Goldman |
| 6,529,556 B1 | 3/2003 | Perdue |
| 6,567,011 B1 | 5/2003 | Young |
| 6,597,374 B1 | 7/2003 | Baker |
| 6,633,281 B2 | 10/2003 | Lin |
| 6,650,248 B1 | 11/2003 | O'Donnell |
| 6,665,020 B1 | 12/2003 | Stahl |
| 6,690,392 B1 | 2/2004 | Wugoski |
| 6,724,339 B2 | 4/2004 | Conway et al. |
| 6,748,278 B1 | 6/2004 | Maymudes |
| 6,781,518 B1 | 8/2004 | Hayes |
| 6,791,467 B1 | 9/2004 | Yuval |
| 6,795,130 B2 | 9/2004 | Shibamiya |
| 6,826,699 B1 | 11/2004 | Sun |
| 6,850,252 B1 | 2/2005 | Hoffberg |
| 6,909,378 B1 | 6/2005 | Lambrechts |
| 6,940,562 B2 | 9/2005 | Sato |
| 6,947,101 B2 | 9/2005 | Arling |
| 6,968,399 B2 | 11/2005 | Noda |
| 6,971,072 B1 | 11/2005 | Stein |
| 6,980,150 B2 | 12/2005 | Conway, Jr. et al. |
| 7,013,434 B2 | 3/2006 | Masters |
| 7,046,161 B2 | 5/2006 | Hayes |
| 7,136,709 B2 | 11/2006 | Arling et al. |
| 7,154,566 B2 | 12/2006 | Gustafson |
| 7,254,777 B2 | 8/2007 | Hayes |
| 7,259,696 B1 | 8/2007 | Lee |
| 7,271,732 B2 | 9/2007 | Harada |
| 7,375,673 B2 | 5/2008 | Spilo |
| 7,379,778 B2 | 5/2008 | Hayes |
| 7,429,932 B1 | 9/2008 | Newell |
| 7,436,346 B2 | 10/2008 | Walter |
| 7,519,393 B2 | 4/2009 | Bahl |
| 7,554,614 B2 | 6/2009 | Satou |
| 7,562,128 B1 | 7/2009 | Caris |
| 7,589,642 B1 | 9/2009 | Mui |
| 7,671,758 B1 | 3/2010 | Seidel |
| 7,768,421 B2 | 8/2010 | Suzuki |
| 7,827,319 B2 | 11/2010 | Kimura |
| 7,831,930 B2 | 11/2010 | Dresti |
| 7,907,222 B2 | 3/2011 | Haughawout |
| 7,936,287 B1 | 5/2011 | Lee |
| 7,944,370 B1 | 5/2011 | Harris |
| 7,969,514 B2 | 6/2011 | Haughawout et al. |
| 8,040,888 B1 | 10/2011 | Macadam |
| 8,068,184 B2 | 11/2011 | Hicks |
| 8,098,337 B2 | 1/2012 | Martch |
| 8,132,105 B1 | 3/2012 | Dubil |
| 8,179,404 B2 | 5/2012 | Nagatomo |
| 8,189,120 B2 | 5/2012 | Doyle |
| 8,199,258 B2 | 6/2012 | Tokoro |
| 8,203,436 B2 | 6/2012 | Ikeda |
| 8,260,975 B1 | 9/2012 | Schanin |
| 8,269,892 B2 | 9/2012 | Asada |
| 8,342,915 B1 | 1/2013 | Vogel |
| 8,373,556 B2 | 2/2013 | Lalonde |
| 8,429,713 B2 | 4/2013 | Candelore |
| 8,477,179 B2 | 7/2013 | Tatsuta |
| 8,508,401 B1 | 8/2013 | Patel et al. |
| 8,509,400 B2 | 8/2013 | Liu et al. |
| 8,525,938 B2 | 9/2013 | Haughawout |
| 8,633,986 B1 | 1/2014 | Hughes |
| 8,704,698 B2 | 4/2014 | Park |
| 8,810,732 B1 | 8/2014 | Bozarth |
| 8,839,334 B2 | 9/2014 | Lee |
| 8,854,192 B1 | 10/2014 | Harris |
| 8,854,556 B2 | 10/2014 | Haughawout |
| 8,881,205 B2 | 11/2014 | Friedman |
| 8,995,981 B1 | 3/2015 | Aginsky |
| 9,019,435 B2 | 4/2015 | Barnett et al. |
| 9,047,761 B2 | 6/2015 | Haughawout |
| 9,088,663 B2 | 7/2015 | Arling |
| 9,098,868 B1 | 8/2015 | Issa |
| 9,123,236 B2 | 9/2015 | Haughawout |
| 9,239,837 B2 | 1/2016 | Chardon |
| 9,350,850 B2 | 5/2016 | Pope |
| 9,451,306 B2 | 9/2016 | Sarukkai |
| 9,489,835 B2 | 11/2016 | Haughawout |
| 9,554,061 B1 | 1/2017 | Proctor, Jr. |
| 9,599,981 B2 | 3/2017 | Crabtree |
| 9,648,358 B2 | 5/2017 | Ellis |
| 9,792,133 B2 | 10/2017 | Lee et al. |
| 9,852,615 B2 | 12/2017 | Perez et al. |
| 9,978,263 B2 | 5/2018 | Haughawout |
| 10,074,364 B1 | 9/2018 | Wightman |
| 10,217,352 B2 | 2/2019 | Arling |
| 10,397,749 B1 | 8/2019 | Barua |
| 10,553,106 B2 | 2/2020 | Jeon |
| 10,593,196 B2 | 3/2020 | Arling |
| 10,600,317 B2 | 3/2020 | Haughawout |
| 10,902,716 B2 | 1/2021 | Perez et al. |
| 11,398,148 B2 | 7/2022 | Perez et al. |

(56) References Cited

U.S. PATENT DOCUMENTS

| | | |
|---|---|---|
| 11,676,483 B2* | 6/2023 | Perez ............... H04M 1/72415 |
| | | 341/176 |
| 11,716,458 B2 | 8/2023 | Marino |
| 2001/0005197 A1 | 6/2001 | Mishra |
| 2001/0043145 A1 | 11/2001 | James, Jr. |
| 2002/0124249 A1 | 9/2002 | Shintani |
| 2002/0140569 A1 | 10/2002 | Van Ee |
| 2002/0158771 A1 | 10/2002 | Mears |
| 2002/0174270 A1 | 11/2002 | Stecyk |
| 2002/0194299 A1 | 12/2002 | Yasaki |
| 2002/0194596 A1 | 12/2002 | Srivastava |
| 2003/0028761 A1 | 2/2003 | Platt |
| 2003/0095156 A1 | 5/2003 | Klein |
| 2003/0095211 A1 | 5/2003 | Nakajima |
| 2003/0103088 A1 | 6/2003 | Dresti et al. |
| 2003/0115599 A1 | 6/2003 | Bennington |
| 2003/0122698 A1 | 7/2003 | Horie et al. |
| 2003/0141987 A1 | 7/2003 | Hayes |
| 2003/0163542 A1 | 8/2003 | Bulthuis |
| 2003/0189509 A1 | 10/2003 | Hayes |
| 2004/0010327 A1 | 1/2004 | Terashima |
| 2004/0056789 A1 | 3/2004 | Arling |
| 2004/0070491 A1 | 4/2004 | Huang |
| 2004/0075602 A1 | 4/2004 | Griesau |
| 2004/0078822 A1 | 4/2004 | Breen |
| 2004/0113892 A1 | 6/2004 | Mears |
| 2004/0143847 A1 | 7/2004 | Suzuki |
| 2004/0148632 A1 | 7/2004 | Park |
| 2004/0163073 A1 | 8/2004 | Krzyzanowski |
| 2004/0203387 A1 | 10/2004 | Grannan |
| 2004/0210933 A1 | 10/2004 | Dresti |
| 2004/0228605 A1 | 11/2004 | Quan |
| 2004/0235463 A1 | 11/2004 | Patel |
| 2004/0255329 A1 | 12/2004 | Compton |
| 2004/0257239 A1 | 12/2004 | Griesau |
| 2004/0266419 A1 | 12/2004 | Arling |
| 2005/0028208 A1 | 2/2005 | Ellis |
| 2005/0052423 A1 | 3/2005 | Harris et al. |
| 2005/0068222 A1 | 3/2005 | Krzyzanowski |
| 2005/0076153 A1 | 4/2005 | Nedellec |
| 2005/0097618 A1* | 5/2005 | Arling ............... H04N 21/6125 |
| | | 725/100 |
| 2005/0110651 A1 | 5/2005 | Martis |
| 2005/0151726 A1 | 7/2005 | Wouters |
| 2005/0154787 A1 | 7/2005 | Cochran |
| 2005/0159823 A1 | 7/2005 | Hayes et al. |
| 2005/0160468 A1 | 7/2005 | Rodriguez |
| 2005/0195823 A1 | 9/2005 | Chen |
| 2005/0210498 A1 | 9/2005 | Scott |
| 2005/0220194 A1 | 10/2005 | Compton |
| 2005/0221792 A1 | 10/2005 | Mattisson |
| 2005/0243057 A1 | 11/2005 | Sugiyama |
| 2005/0273817 A1 | 12/2005 | Rodriguez |
| 2006/0007015 A1 | 1/2006 | Krzyzanowski |
| 2006/0044175 A1 | 3/2006 | Choi |
| 2006/0080408 A1 | 4/2006 | Istvan |
| 2006/0080707 A1 | 4/2006 | Laksono |
| 2006/0095401 A1 | 5/2006 | Krikorian |
| 2006/0095596 A1 | 5/2006 | Yung |
| 2006/0146184 A1 | 7/2006 | Gillard |
| 2006/0150123 A1 | 7/2006 | Goodwin et al. |
| 2006/0156109 A1 | 7/2006 | Kojima |
| 2006/0168618 A1 | 7/2006 | Choi |
| 2006/0197753 A1 | 9/2006 | Hotelling |
| 2006/0200538 A1 | 9/2006 | Yuh |
| 2006/0227032 A1 | 10/2006 | Vidal |
| 2006/0245725 A1 | 11/2006 | Lim |
| 2006/0263091 A1 | 11/2006 | Shimizu |
| 2006/0271997 A1 | 11/2006 | Jacoby |
| 2007/0037522 A1* | 2/2007 | Liu ............... H04N 21/42226 |
| | | 455/68 |
| 2007/0052547 A1 | 3/2007 | Haughawout |
| 2007/0063860 A1 | 3/2007 | Escobosa |
| 2007/0063862 A1 | 3/2007 | Lippincott |
| 2007/0130607 A1 | 6/2007 | Thissen |
| 2007/0165555 A1 | 7/2007 | Deng |
| 2007/0220150 A1 | 9/2007 | Garg |
| 2007/0225828 A1 | 9/2007 | Huang |
| 2007/0229465 A1 | 10/2007 | Sakai |
| 2007/0268360 A1 | 11/2007 | Ahlgren |
| 2007/0288610 A1 | 12/2007 | Saint Clair |
| 2007/0288932 A1 | 12/2007 | Horvitz |
| 2007/0292135 A1 | 12/2007 | Guo |
| 2008/0004954 A1 | 1/2008 | Horvitz |
| 2008/0005764 A1 | 1/2008 | Arling |
| 2008/0007616 A1 | 1/2008 | Baladhandayuthapani |
| 2008/0044006 A1 | 2/2008 | Kitagawa |
| 2008/0046919 A1 | 2/2008 | Carmi |
| 2008/0098426 A1 | 4/2008 | Candelore |
| 2008/0120673 A1 | 5/2008 | Dong |
| 2008/0126591 A1 | 5/2008 | Kwon |
| 2008/0134237 A1* | 6/2008 | Tu ............... H04N 7/1675 |
| | | 725/38 |
| 2008/0139181 A1 | 6/2008 | Lokshin |
| 2008/0141316 A1 | 6/2008 | Igoe |
| 2008/0155071 A1 | 6/2008 | Lindstrom |
| 2008/0168519 A1 | 7/2008 | Rao |
| 2008/0187028 A1 | 8/2008 | Lida |
| 2008/0195857 A1 | 8/2008 | Douillet |
| 2008/0221715 A1 | 9/2008 | Krzyzanowski |
| 2008/0231762 A1 | 9/2008 | Hardacker |
| 2008/0244097 A1 | 10/2008 | Candelore et al. |
| 2008/0247544 A1 | 10/2008 | Candelore |
| 2008/0278567 A1 | 11/2008 | Nakajima |
| 2008/0319852 A1 | 12/2008 | Gardner |
| 2008/0320531 A1 | 12/2008 | Kim |
| 2008/0320542 A1 | 12/2008 | Guzman |
| 2009/0015723 A1 | 1/2009 | Doumuki |
| 2009/0031419 A1 | 1/2009 | Laksono |
| 2009/0040091 A1 | 2/2009 | Carlson |
| 2009/0051824 A1 | 2/2009 | Satou |
| 2009/0079813 A1 | 3/2009 | Hildreth |
| 2009/0092397 A1 | 4/2009 | Taguchi |
| 2009/0094645 A1 | 4/2009 | Ting |
| 2009/0106785 A1 | 4/2009 | Pharn |
| 2009/0113478 A1 | 4/2009 | Haughawout et al. |
| 2009/0115723 A1 | 5/2009 | Henty |
| 2009/0121905 A1 | 5/2009 | Griffin, Jr. et al. |
| 2009/0156051 A1 | 6/2009 | Doyle |
| 2009/0156251 A1 | 6/2009 | Cannistraro |
| 2009/0157198 A1 | 6/2009 | Morikawa |
| 2009/0167555 A1 | 7/2009 | Kohanek |
| 2009/0172746 A1 | 7/2009 | Aldrey |
| 2009/0195407 A1 | 8/2009 | Nakano et al. |
| 2009/0207039 A1 | 8/2009 | Haijima |
| 2009/0239587 A1 | 9/2009 | Negron et al. |
| 2009/0248909 A1 | 10/2009 | Hironaka |
| 2009/0254500 A1 | 10/2009 | Stecyk |
| 2009/0254778 A1 | 10/2009 | Huang |
| 2009/0265163 A1 | 10/2009 | Lehmann et al. |
| 2009/0284656 A1 | 11/2009 | Suzuki |
| 2009/0289829 A1 | 11/2009 | Maier |
| 2009/0296731 A1 | 12/2009 | Lida |
| 2009/0298535 A1 | 12/2009 | Klein |
| 2010/0013998 A1 | 1/2010 | Mortensen |
| 2010/0014834 A1 | 1/2010 | Flynn |
| 2010/0034522 A1 | 2/2010 | Ng |
| 2010/0037264 A1 | 2/2010 | Hardacker |
| 2010/0039282 A1 | 2/2010 | Hostage |
| 2010/0043046 A1 | 2/2010 | Sen |
| 2010/0052843 A1 | 3/2010 | Cannistraro |
| 2010/0079682 A1 | 4/2010 | Martch |
| 2010/0118193 A1 | 5/2010 | Boyden |
| 2010/0131682 A1 | 5/2010 | Huang |
| 2010/0134317 A1 | 6/2010 | Breuil |
| 2010/0135279 A1 | 6/2010 | Petersson |
| 2010/0138764 A1 | 6/2010 | Hatambeiki |
| 2010/0149017 A1 | 6/2010 | Besshi |
| 2010/0153990 A1 | 6/2010 | Ress |
| 2010/0157169 A1 | 6/2010 | Yoshida |
| 2010/0175026 A1* | 7/2010 | Bortner ............... G06F 16/44 |
| | | 715/825 |
| 2010/0177245 A1 | 7/2010 | Ohnuma |
| 2010/0182236 A1 | 7/2010 | Pryor |

(56) References Cited

U.S. PATENT DOCUMENTS

| | | |
|---|---|---|
| 2010/0194983 A1 | 8/2010 | Iguchi |
| 2010/0228611 A1 | 9/2010 | Shenfield |
| 2010/0271560 A1 | 10/2010 | Higuchi |
| 2010/0296558 A1 | 11/2010 | Matsushita |
| 2010/0315279 A1 | 12/2010 | Hamai |
| 2010/0328547 A1 | 12/2010 | Mayorga |
| 2011/0074591 A1* | 3/2011 | Arling ............ H04N 21/4221 340/635 |
| 2011/0102230 A1 | 5/2011 | Vergis |
| 2011/0122317 A1 | 5/2011 | Chen |
| 2011/0125301 A1 | 5/2011 | Inoue |
| 2011/0138327 A1 | 6/2011 | Scott |
| 2011/0142059 A1 | 6/2011 | Bedingfield, Sr. |
| 2011/0156944 A1 | 6/2011 | Ward |
| 2011/0179149 A1 | 7/2011 | Kazan |
| 2011/0181386 A1 | 7/2011 | Lee |
| 2011/0187928 A1 | 8/2011 | Crabtree |
| 2011/0273287 A1 | 11/2011 | Lalonde |
| 2011/0273625 A1 | 11/2011 | McMahon et al. |
| 2011/0274008 A1 | 11/2011 | Lida |
| 2011/0283129 A1 | 11/2011 | Guillerm |
| 2011/0285818 A1 | 11/2011 | Park |
| 2011/0289113 A1 | 11/2011 | Arling |
| 2011/0291971 A1 | 12/2011 | Masaki et al. |
| 2011/0302619 A1 | 12/2011 | Hale |
| 2011/0314153 A1 | 12/2011 | Bathiche |
| 2012/0013449 A1 | 1/2012 | Penisoara |
| 2012/0013807 A1 | 1/2012 | Arora |
| 2012/0019400 A1 | 1/2012 | Patel |
| 2012/0019633 A1 | 1/2012 | Holley |
| 2012/0021684 A1 | 1/2012 | Schultz et al. |
| 2012/0025957 A1 | 2/2012 | Yang |
| 2012/0044061 A1* | 2/2012 | Sakai .................. G08C 17/00 340/12.5 |
| 2012/0050310 A1 | 3/2012 | Patel |
| 2012/0062805 A1 | 3/2012 | Candelore |
| 2012/0069246 A1 | 3/2012 | Thornberry |
| 2012/0069894 A1 | 3/2012 | Sakimura |
| 2012/0082461 A1 | 4/2012 | Meyer |
| 2012/0084452 A1 | 4/2012 | Pettit |
| 2012/0084662 A1 | 4/2012 | Navarro et al. |
| 2012/0086869 A1 | 4/2012 | Friedlander |
| 2012/0105721 A1 | 5/2012 | Huang |
| 2012/0131245 A1 | 5/2012 | Wilcox |
| 2012/0133841 A1 | 5/2012 | Vanderhoff |
| 2012/0144416 A1 | 6/2012 | Wetzer |
| 2012/0146918 A1 | 6/2012 | Kreiner |
| 2012/0171958 A1 | 7/2012 | Cornett |
| 2012/0173003 A1 | 7/2012 | Kim |
| 2012/0185580 A1 | 7/2012 | Detert |
| 2012/0196536 A1 | 8/2012 | Koo |
| 2012/0236161 A1 | 9/2012 | Kwon |
| 2012/0242526 A1 | 9/2012 | Perez |
| 2012/0249890 A1 | 10/2012 | Chardon |
| 2012/0274547 A1 | 11/2012 | Raeber |
| 2012/0274857 A1 | 11/2012 | Maxwell |
| 2012/0274863 A1 | 11/2012 | Chardon et al. |
| 2012/0278693 A1 | 11/2012 | Black |
| 2012/0284758 A1 | 11/2012 | Adjesson |
| 2012/0291128 A1 | 11/2012 | Jayawardena |
| 2012/0297040 A1 | 11/2012 | Amano |
| 2012/0330943 A1 | 12/2012 | Weber |
| 2013/0005250 A1 | 1/2013 | Kim |
| 2013/0057774 A1 | 3/2013 | Yoshida |
| 2013/0058522 A1 | 3/2013 | Raesig |
| 2013/0069769 A1 | 3/2013 | Pennington et al. |
| 2013/0085851 A1 | 4/2013 | Pedro |
| 2013/0106977 A1 | 5/2013 | Chu |
| 2013/0198005 A1 | 8/2013 | Xiong |
| 2013/0249679 A1 | 9/2013 | Arling |
| 2013/0258918 A1 | 10/2013 | Rudland |
| 2013/0265248 A1 | 10/2013 | Nagahara |
| 2013/0276010 A1 | 10/2013 | Drayson |
| 2013/0298147 A1 | 11/2013 | Klein |
| 2013/0304817 A1 | 11/2013 | Hu |
| 2014/0085059 A1 | 3/2014 | Chen |
| 2014/0115631 A1 | 4/2014 | Mak |
| 2014/0157305 A1 | 6/2014 | Del Sordo |
| 2014/0222861 A1 | 8/2014 | Arling |
| 2014/0235526 A1 | 8/2014 | Srivastava |
| 2014/0279047 A1 | 9/2014 | Wang |
| 2014/0337879 A1 | 11/2014 | Arling |
| 2015/0032541 A1 | 1/2015 | Haddad |
| 2015/0187206 A1 | 7/2015 | Saurin |
| 2015/0289030 A1 | 10/2015 | Roberts |
| 2016/0017585 A1 | 1/2016 | Plate |
| 2016/0057537 A1 | 2/2016 | Robinson |
| 2016/0125733 A1 | 5/2016 | Sallas |
| 2016/0173961 A1 | 6/2016 | Coan |
| 2017/0024119 A1 | 1/2017 | Wild |
| 2017/0168595 A1 | 6/2017 | Sakaguchi |
| 2017/0205783 A1 | 7/2017 | Tannenbaum |
| 2017/0279497 A1 | 9/2017 | Schultz et al. |
| 2017/0289484 A1 | 10/2017 | Arling |
| 2018/0130469 A1 | 5/2018 | Gruenstein |
| 2018/0211651 A1 | 7/2018 | Hall |
| 2019/0033446 A1 | 1/2019 | Bultan |
| 2019/0261043 A1 | 8/2019 | Hideki |
| 2019/0287525 A1 | 9/2019 | Kim |
| 2019/0379887 A1 | 12/2019 | Marino |
| 2020/0092641 A1 | 3/2020 | Smus |
| 2020/0204613 A1 | 6/2020 | Hatambeiki |
| 2021/0120301 A1 | 4/2021 | Xu |
| 2021/0368562 A1 | 11/2021 | Hatambeiki |
| 2022/0030296 A1 | 1/2022 | Satheesh |
| 2022/0051554 A1 | 2/2022 | Tchedikian |
| 2022/0053230 A1 | 2/2022 | Tchedikian |
| 2022/0109669 A1 | 4/2022 | Yuh |
| 2022/0294639 A1 | 9/2022 | Amsalem |
| 2023/0106761 A1 | 4/2023 | Coffman |

FOREIGN PATENT DOCUMENTS

| | | |
|---|---|---|
| EP | 1722341 A1 | 11/2006 |
| EP | 2265003 A2 | 12/2010 |
| EP | 3084744 A1 | 10/2016 |
| EP | 1489575 B1 | 7/2017 |
| EP | 2490195 B1 | 4/2022 |
| GB | 2166328 A | 6/1989 |
| JP | 05083765 A | 7/2009 |
| JP | 2010034853 A | 2/2010 |
| JP | 2013085225 A | 5/2013 |
| KR | 10-2011-0051788 | 5/2011 |
| KR | 10-2013-0070764 | 6/2013 |
| WO | 89/11137 A1 | 11/1989 |
| WO | 9732290 | 9/1997 |
| WO | 0013344 A1 | 3/2000 |
| WO | 0017738 | 3/2000 |
| WO | 0034851 | 6/2000 |
| WO | 0039772 | 7/2000 |
| WO | 0147130 | 6/2001 |
| WO | 03044684 | 5/2003 |
| WO | 03044756 W | 5/2003 |
| WO | 0383801 | 10/2003 |
| WO | 05036325 | 4/2005 |
| WO | 2007105142 A1 | 9/2007 |
| WO | 2011053008 A2 | 5/2011 |
| WO | 2015095637 A1 | 6/2015 |
| WO | 2016126609 A2 | 8/2016 |
| WO | 2018198036 A1 | 11/2018 |
| WO | 2018224812 A1 | 12/2018 |
| WO | 2019236764 A1 | 12/2019 |
| WO | 2020172134 A1 | 8/2020 |
| WO | 2020232336 A1 | 11/2020 |

OTHER PUBLICATIONS

2010 Spring BD-Players, BOP IP & RS-232 Control Version 1. 00. 00, Edited Dec. 8, 2010 {"Remote Code Commands Lisi") https://www.pioneerelectronics.com/SlaticFiles/PUSA/Files/Home%20Custom%20In ,tall/2010%20Pioneer"/o20BDP330_IP &_RS-232_ Commands.pdf), 3 pp.

(56) References Cited

OTHER PUBLICATIONS

AT2400 AllTouch Remote Control User's Guide, Scientific Atlanta Inc., (2002), 2 pp.
Commission Decision in ITC-337-TA-1200, 45 pp.
Connecting the Explorer 8300HDTM Digital Video Recorder Manual, Scientific Atlantic Inc. (2005), 27 pp.
Declaration of Samuel H. Russ, PhD, 100 pp.
Ex-Parte Quayle Office Action issued on U.S. Appl. No. 17/527,390, dated Feb. 3, 2022, 6 pgs.
Expert Report of Dr. Craig Rosenberg from ITC-337-TA-1200 dated Nov. 19, 2020 (Redacted Relevant Pages—Non Confidential Version), 9 pp.
Extended European search report issued of European patent application No. 19871693.8 dated Jun. 14, 2022, 10 pages.
Extended European Search Report issued on European patent application No. 19908998.8, dated Sep. 27, 2022, 10 pages.
Extended European search report issued on European patent application No. 20909517.3, dated Jan. 5, 2022, 10 pages.
Extended European search report issued on European patent application No. 20910756.4, dated Dec. 20, 2022, 11 pages.
Extended European Search Report issued on European patent application No. 21217138.3, dated Apr. 7, 2022, 12 pages.
File History of U.S. Pat. No. 10,600,317 to Haughawout.
Final Office Action from U.S. Appl. No. 17/686,039, dated Oct. 3, 2023, 11 pp.
Infrared Data Association Serial Infrared Physical Layer Specification, Version 1.4, May 30, 2001, 1994, Infrared Data Association, 68 pgs.
Initial Determination in ITC-337-TA-1200, 154 pp.
Int. Search Report and Written Opinion issued on PCT application No. PCT/US22/33028, dated Oct. 14, 2022, 20 pages.
International CES 2000 Report—Universal Electronics Inc. (2000) http://www.remotecentral.com/ces2000/uei.hlm), 2 pp.
ITC Commission Opinion, Inv. No. 337-TA-1200, issued Dec. 3, 2021, 46 pp.
ITC Markman Order, Inv. No. 337-TA-1200, filed Oct. 1, 2020.
Logitech Harmony 900 Universal Remote Review, by David Rees, The Gadgeteer, User Review 2 (hllps://the-gadgeteer.com/2010/01/25/logitech-harmony-900-universal-remotereview/), 16 pp.
Michael Brown, Product Reviews—Logitech Harmony 900 Review, User Review 1 Sep. 14, 2009) {https:/lwww.digitaltrends.com/gadget-reviews/logitech-harmony-900-review/), 18 pp.
Non-Final Office Action issued in U.S. Appl. No. 17/461,237, dated Aug. 17, 2022, 8 pgs.
Non-Final Office Action issued in U.S. Appl. No. 17/665,219, dated Feb. 16, 2023, 10 pgs.
Non-Final Office Action issued on U.S. Appl. No. 16/114,762, Notification Date of Feb. 14, 2020, 13 pgs.
Non-Final Office Action issued on U.S. Appl. No. 16/540,635, Notification Date of Feb. 24, 2020, 11 pgs.
Non-Final Office Action issued on U.S. Appl. No. 16/778,638, Notification Date of Mar. 6, 2020, 8 pgs.
Non-Final Office Action issued on U.S. Appl. No. 17/375,566, dated Jan. 21, 2022, 19 pgs.
Non-Final Office Action issued on U.S. Appl. No. 17/527,532, dated Feb. 10, 2022, 10 pgs.
Patent Owner Infringement Claim Chart of U.S. Pat. No. 10,593,196 marked Ex. 5 in ITC-337-TA-1200 (Redacted Relevant Pages—Non Confidential Version), 9 pp.
Patent Owners Preliminary Response in IPR2021-00299, 63 pp.
Transcript of the Sep. 30, 2020 Deposition of Dr. Turnbull, 166 pp.
U.S. Appl. No. 61/680,876 to Arling et al.
United States Court of Appeals for the Federal Circuit, In re: Universal Electronics, Inc., 2022-1757, Opinion filed for the court by Reyna, Taranto, and STOLL, Circuit Judges, Nonprecedential Opinion. Date entered/ received: Jun. 14, 2023, 4 pgs.
Universal Electronics Inc., "Universal Electronics Teams Up with Sensory to Deliver Smart Home Digital Assistant Platform with Embedded Voice Control and Branded Assistant Experience." Jan. 4, 2019 {Jan. 4, 2019) Retrieved on Aug. 19, 2022 {Aug. 19, 2022) from <https://universalelectronicsinc.gcs-web.com/news-releases/newselease-details/universal-electronics-teams-sensory-deliver-smart-home-digital> , 2 pp.
European Patent Office, Extended European Search Report issued on European patent application No. 12765455.6, dated Aug. 5, 2014, 9 pages.
The Int. Bureau of WIPO, Preliminary Report on Patentability issued on PCT/US12/027841, received Oct. 10, 2013, 7 pgs.
China National Intellectual Property Administration, Second Office Action issued in CN App. No. 201480057944.0, Dated Jul. 16, 2019, 21 pgs.
Digital Video Recorder with TiVo, Spring and Fall 2001, Service Update Guide, 65 pgs.
Direct TV TiVo Installation Guide, Hughes Network Systems, 68 pgs.
EPO, examination report issued on European patent application No. 14801064.8, dated Jul. 11, 2019, 4 pages.
ETSI TS 102 006 v1 .3.1, (May 2004), Technical Specification, Digital Video Broadcasting (DVB); Specification for System Software Update in DVB Systems, European Broadcasting Union, 39 pgs.
European Patent Office, extended European Search Report issued on European patent application No. 12844121.9, dated Mar. 5, 2015, 6 pages.
European Patent Office, extended European Search Report issued on European patent application No. 14801064.8, dated Apr. 18, 2016, 8 pages.
European Patent Office, extended European Search Report issued on European patent application No. 14872863.7, dated Nov. 25, 2016, 8 pages.
Final Office Action issued on U.S. Appl. No. 16/199,463, Notification Date of May 6, 2020, 14 pgs.
Final Office Action issued on U.S. Appl. No. 16/778,638, Notification date of Jul. 23, 2020, 6 pgs.
Final Office Action issued on U.S. Appl. No. 15/900,232, dated Dec. 13, 2018, 15 pages.
Final Office Action issued on U.S. Appl. No. 15/900,342, dated Nov. 29, 2018, 19 pages.
In re reexam of U.S. Pat. No. 10,600,317 to Haughawout et al., For System and Method for Simplified SetUp of a Universal Remote Control, Declaration of Mr. John Tinsman Under 37 C.F.R. § 1.132, 121 pgs.
Int. Search Report and Written Opinion of the Int. Searching Authority issued on Int. Appln. No. PCT/US12/62161, received Jan. 23, 2013, 12 pages.
Int. Search Report and Written Opinion of the Int. Searching Authority issued on Int. Appln. No. PCT/US14/38151, received Jun. 27, 2014, 9 pages.
International Search Report and Written Opinion issued on PCT application No. US19/54315, dated Jan. 2, 2020, 16 pages.
ISA/KR, Int'l Search Report issued in Appln. No. PCT/US12/60390, dated Jul. 18, 2013, 4 pgs.
ISA/KR, Written Opinion issued in Appln. No. PCT/US12/60390, dated Jul. 18, 2013, 7 pgs.
User Manual Harmony 900—Remote Control User Guide, Version 1.0, Logitech, 59 pp.
User Interface—Infrared Learner {Remote Control), Application Note AN2092, Cypress Semiconductor, Document No. 001-41063, {Nov. 11, 2002), 7 pp.
Non-final Office Action from U.S. Appl. No. 17/686,039, mailed May 10, 2023, 14 pp.
Non-final Office Action from U.S. Appl. No. 17/686,180, mailed May 23, 2023, 13 pp.
Non-Final Office Action issued on U.S. Appl. No. 16/156,766, Notification Date of Oct. 4, 2019, 10 pgs.
Non-Final Office Action issued on U.S. Appl. No. 16/196,756, Notification Date of Sep. 6, 2019, 9 pgs.
Non-Final Office Action issued on U.S. Appl. No. 16/197,552, Notification Date of Sep. 19, 2019, 10 pgs.
Non-Final Office Action issued on U.S. Appl. No. 16/197,748, Notification Date of Sep. 6, 2019, 9 pgs.
Non-Final Office Action issued on U.S. Appl. No. 16/457,309, Notification Date of Mar. 6, 2020, 17 pgs.

(56) References Cited

OTHER PUBLICATIONS

Non-Final Office Action issued on U.S. Appl. No. 16/783,971, Dated Sep. 2, 2020, 8 pgs.
Non-Final Office Action issued on U.S. Appl. No. 16/814,493, dated Feb. 19, 2021, 15 pgs.
Non-Final Office Action issued on U.S. Appl. No. 16/838,736 dated Mar. 18, 2021, 15 pgs.
Norme Internationale International Standard, CEI IEC 61883-1, First edition, Feb. 1998, Consumer audio/video equipment-Digital interface—Part 1 :General, Copyright International Electrotechnical Commission, Ref. No. EI/IEC 61883-1:1998, Order No. W2248667, 100 pgs.
Notice of Allowance issued in U.S. Appl. No. 17/665,219, dated May 16, 2023, 6 pgs.
Personal TV Owner's Guide, TiVo, Philips, 1999 by TiVo, Inc., USA, 153 pgs.
Petition for Inter Partes Review of U.S. Pat. No. 10,600,317, Case No. IPR2021-00263, *Roku, Inc.* v. *UEI, Inc.*, 94 pp.
Petition for Inter Partes Review of U.S. Pat. No. 10,600,317, Case No. IPR2021-00264, *Roku, Inc.* v. *UEI, Inc.*, 63 pp.
Philips, Directv, TiVo, DIRECTV Receiver with TiVo Viewer's Guide, 154 pgs.
PocketRemote: Integrating a Universal Remote Control with a Handheld Computer, Angus Huang, Submitted to the Department of Electrical Engineering and Computer Science, Feb. 1, 2002, 2002 Angus Huang, 106 pgs.
RCA, Tivo Viewer's Guide, 1999, 2000 by TiVo, Inc., 96 pgs.
*Roku, Inc.,* v. *UEI, Inc.*, U.S. Pat. No. 10,600,317, Declaration of Margaret Schmidt, 7 pgs.
Sony, 2001 Home Network Products, SVR-2000 Digital Network Recorder, 2001 Sony Electronics Inc., 6 pgs.
Sony, 3-060-082-01 (1 ), Digital Network Recorder SVR-2000, Setup Guide, 2000 by Sony Corporation, Sunnyvale, CA, 94089, http://www.tivo.com, 68 pgs.
TiVo Installation Guide—Series 2 Digital Video Recorder, archived by web.archive.org on Aug. 12, 2004, with Affidavit of Elizabeth Rosenberg attached ("TiVo"), 88 pp.
U.S. International Trade Commission, Washington, D.C., In the Matter of Certain Electronic Devices, Including Streaming Players, Televisions, Set Top Boxes, Remote Controllers, and Components Thereof, Inv. No. 337-TA-1200, Initial Determination on Violation of Section 337 and Recommended Determination on Remedy and Bond, 154 pp.
Z—ZiLOG, Z90356 and Z90351, 64KWord Television 50 Controller With Expanded OSD Features, PB000102-1102, Product Brief and Product Block Diagram, 6 pgs., ZiLOG Worldwide Headquarters, San Jose, CA., zservice@zilog.com; www.zilog.com.
VCR Commander™ Service User's Guide, Scientific—Atlanta Inc. (2000), 28 pp.
Office action issued on Korean patent application No. 10-2017-7024670, mailed May 24, 2022, 11 pages.
Extended European Search Report issued on EP patent application No. 13162431.4, dated Jan. 20, 2014, 7 pages.
Extended European Search Report issued on EP patent application No. 13162427.2, dated May 14, 2014, 14 pages.
Final Office Action issued in U.S. Appl. No. 17/524,827, dated Jun. 22, 2022, 21 pgs.
Final Office Action issued in U.S. Appl. No. 17/524,549, dated May 31, 2022, 26 pgs.
Non-final Office Action from U.S. Appl. No. 17/686,039, dated Jan. 4, 2024, 11 pp.
Non-Final Office Action issued in U.S. Appl. No. 17/186, 156, dated Aug. 4, 2022, 14 pgs.
Non-Final Office Action issued on U.S. Appl. No. 15/843,376, dated Jul. 12, 2018, 7 pgs.
Non-Final Office Action issued on U.S. Appl. No. 15/843,407, dated Sep. 20, 2018, 9 pgs.
Non-Final Office Action issued on U.S. Appl. No. 16/393,348, dated Aug. 8, 2019, 7 pgs.

Office Action issued on EP patent application No. 13162427.2, received Apr. 3, 2017, 6 pages.
Office Action issued on EP patent application No. 13162431.4, dated Apr. 4, 2017, 5 pages.
Partial European Search Report issued on EP patent application No. 13162427.2, dated Jan. 23, 2014, 6 pages.
Non-final Office Action from U.S. Appl. No. 17/887,624, dated Apr. 5, 2024, 32 pp.
Non-final Office Action from U.S. Appl. No. 18/233,192, dated Mar. 21, 2024, 17 pp.
Non-final Office Action from U.S. Appl. No. 18/229,841, dated Mar. 19, 2024, 6 pp.
Non-final Office Action from U.S. Appl. No. 17/888,602, dated May 21, 2024, 20 pp.
Examination report issued on European patent application No. 11870232.3, dated Dec. 14, 2016, 3 pages.
Examination report issued on European patent application No. 11872554.8, dated Jul. 31, 2018, 5 pages.
Examination report issued on European patent application No. 15796548.4, dated Aug. 16, 2019, 5 pages.
Examination report issued on European patent application No. 16747061.6, dated Apr. 14, 2020, 5 pages.
Examination report issued on European patent application No. 21170794.8, dated Aug. 31, 2022, 3 pages.
Extended European Search Report issued on European Patent Application No. 11870232.3, dated Nov. 19, 2014, 7 pages.
Extended European Search Report issued on European Patent Application No. 11872554.8, dated Feb. 26, 2015, 5 pages.
Extended European Search Report issued on European Patent Application No. 12763258.6, dated Jan. 2, 2014, 7 pages.
Extended European Search Report issued on European Patent Application No. 12763258.6, dated Jul. 28, 2014, 8 pages.
Extended European search report issued on European patent application No. 21170794.8, dated Sep. 20, 2021, 7 pages.
Final Office Action issued in U.S. Appl. No. 17/733,254, dated Jan. 10, 2023, 11 pgs.
Final Office Action issued on U.S. Appl. No. 14/736,909, dated Aug. 16, 2018, 6 pgs.
Ingrid Wickelgren, Apr. 1997, IEEE Spectrum, vol. Apr. 1997, pp. 20-25.
International Preliminary Report on Patentability issued on PCT application No. US/2015/030258, dated Dec. 1, 2016, 7 pages.
Non-Final Office Action issued in U.S. Appl. No. 17/733,254, dated Sep. 27, 2022, 10 pgs.
Non-Final Office Action issued on U.S. Appl. No. 14/736,909, dated Apr. 4, 2018, 11 pages.
Non-Final Office Action issued on U.S. Appl. No. 16/106,831, dated Jul. 25, 2019, 6 pgs.
Non-Final Office Action issued on U.S. Appl. No. 16/596,549, dated Sep. 2, 2020, 7 pgs.
Notice of Final Rejection issued on Korean patent application No. 10-2016-7033626, dated Aug. 6, 2021, 9 pages.
Office Action issued on Brazilian patent application No. BR112014006930.1, received Nov. 8, 2019, 2 pages.
Office Action issued on Brazilian patent application No. BR1120140069301, received Oct. 27, 2020, 3 pages.
Office Action issued on Chinese patent application No. 201680008875.3, dated Sep. 1, 2020, 22 pages.
Office Action issued on Chinese patent application No. 201680008875.3, received Sep. 19, 2019, 9 pages.
Office action issued on Indian patent application No. 201747027318, dated Apr. 12, 2021, 6 pages.
Office Action issued on Japanese patent application No. 2017-541066, dated Feb. 18, 2020, 18 pages.
Office Action issued on Japanese patent application No. 2017-541066, received Oct. 8, 2019, 18 pages.
Extended Search Report from European application No. 22821119.9, dated Oct. 2, 2024, 13 pp.
Non-final Office Action from U.S. Appl. No. 17/887,624, dated Aug. 9, 2024, 32 pp.
Final Office Action from U.S. Appl. No. 17/888,602, dated Aug. 9, 2024, 21 pp.

(56) References Cited

OTHER PUBLICATIONS

Office Action from EP application No. 21217138.3, dated Mar. 19, 2024, 10 pp.

\* cited by examiner

SYSTEM AND METHOD FOR FACILITATING APPLIANCE CONTROL VIA A SMART DEVICE

RELATED APPLICATION INFORMATION

This application claims the benefit of and is a continuation of U.S. application Ser. No. 17/834,662, filed on Jun. 7, 2022, which application claims the benefit of and is a continuation of U.S. application Ser. No. 17/126,731, filed on Dec. 18, 2020, which application claims the benefit of and is a continuation of U.S. application Ser. No. 15/832,268, filed on Dec. 5, 2017, which application claims the benefit of and is a continuation of U.S. application Ser. No. 13/071,661, filed on Mar. 25, 2011, the disclosures of which are incorporated herein by reference in their entirety.

BACKGROUND

Personal communication, productivity, and entertainment devices such as cellular phones, PDAs, portable email devices, tablet computers, e-books, hand-held games, portable media players, etc. (all referred to hereafter as "smart devices") are known to include features such as graphical user interfaces on color touch screens, Bluetooth and/or WiFi capability, etc. Increasingly, such smart devices also incorporate support for ancillary applications (hereafter referred to as "apps") for example calendars, email, maps and navigation, etc. Such ancillary applications may be pre-installed in a smart device or may be made available for download by a user. Certain apps may comprise an ability to issue commands to entertainment and other appliances, for example in conjunction with a GUI offering the features and functionality of a universal remote control, as a user convenience in conjunction with a TV guide display to enable channel selection, etc.

In order to effect such control functionality, it is known in the art to provision a smart device with hardware and/or firmware suitable for the generation of appliance command signals. Provision of such hardware and/or firmware may be internal, i.e. built into a smart device; may be external, i.e., in the form of add-on attachments to a smart device; or may be discrete, i.e., in the form of a separate self-contained unit which receives wireless signals from a smart device and converts them to appropriate appliance command transmissions.

SUMMARY OF THE INVENTION

This invention relates generally to systems and methods for equipping a smart device with appliance command functionality, and in particular to the provision of a discrete device for receiving and converting appliance command requests from a smart device, which discrete device may also include the ability to directly issue appliance commands in response to user input.

It is known in the art to provide a self-contained bridge device, comprising for example a receiver, a processing/translation means, and a transmitter, which bridge device is capable of receiving generic appliance command requests from a smart device via, for example, an RF link such as Bluetooth or WiFi and translating these command requests into appliance-recognizable transmissions, these transmissions usually (but not necessarily) taking the form of infrared ("IR") encoded signals which may emulate a target appliance's original equipment remote control. The availability of such bridge devices greatly facilitates the deployment of remote control apps for smart devices, since apps intended for use in conjunction with bridge devices may then comprise a simple software GUI with no requirement for additional hardware or firmware installed onto or built into the target smart device.

However, the use of smart device apps for appliance control, with or without prior art bridge units as described above, may remain less than optimal in many environments. Since a smart device, particularly a smart phone, is essentially a personal device, it may not be readily available for communal use when several persons are present in the environment to be controlled, for example a family watching TV in the home. Furthermore, minor equipment adjustments which necessitate repeated activation of a smart device remote control app, for example such as may occur each time a TV commercial airs and audio volume needs to be adjusted, may constitute a considerable inconvenience to the owner of the smart device.

The improvement presented herein addresses these and other shortcomings. An inventive bridge unit provides the RF reception and command translation functionality of prior art units while additionally accepting direct control inputs for a limited number of commonly used appliance command functions. These direct control inputs may take the form of pushbuttons, knobs, touchpads, etc., located on the physical bridge unit itself, which unit may be designed to be placed in the environment at an easily accessible location such as, for example, on a coffee table. In this manner, commonly used adjustments such as volume or muting, playback pause/resume, etc. may be made readily available without necessitating the use of a smart device, whilst the more sophisticated GUI provided by a smart device remote control app may be advantageously utilized when more complex or less frequently used command functions are to be performed, and/or where appliance or media control is a feature of the app, for example when implementing functionality such as described in co-pending U.S. patent application Ser. No. 12/327,875 "System and Method for Interacting with a Program Guide Displayed on a Portable Electronic Device" or Ser. No. 12/761,161 "System and Methods for Enhanced Metadata Entry" both of common ownership and both incorporated herein by reference in their entirety.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
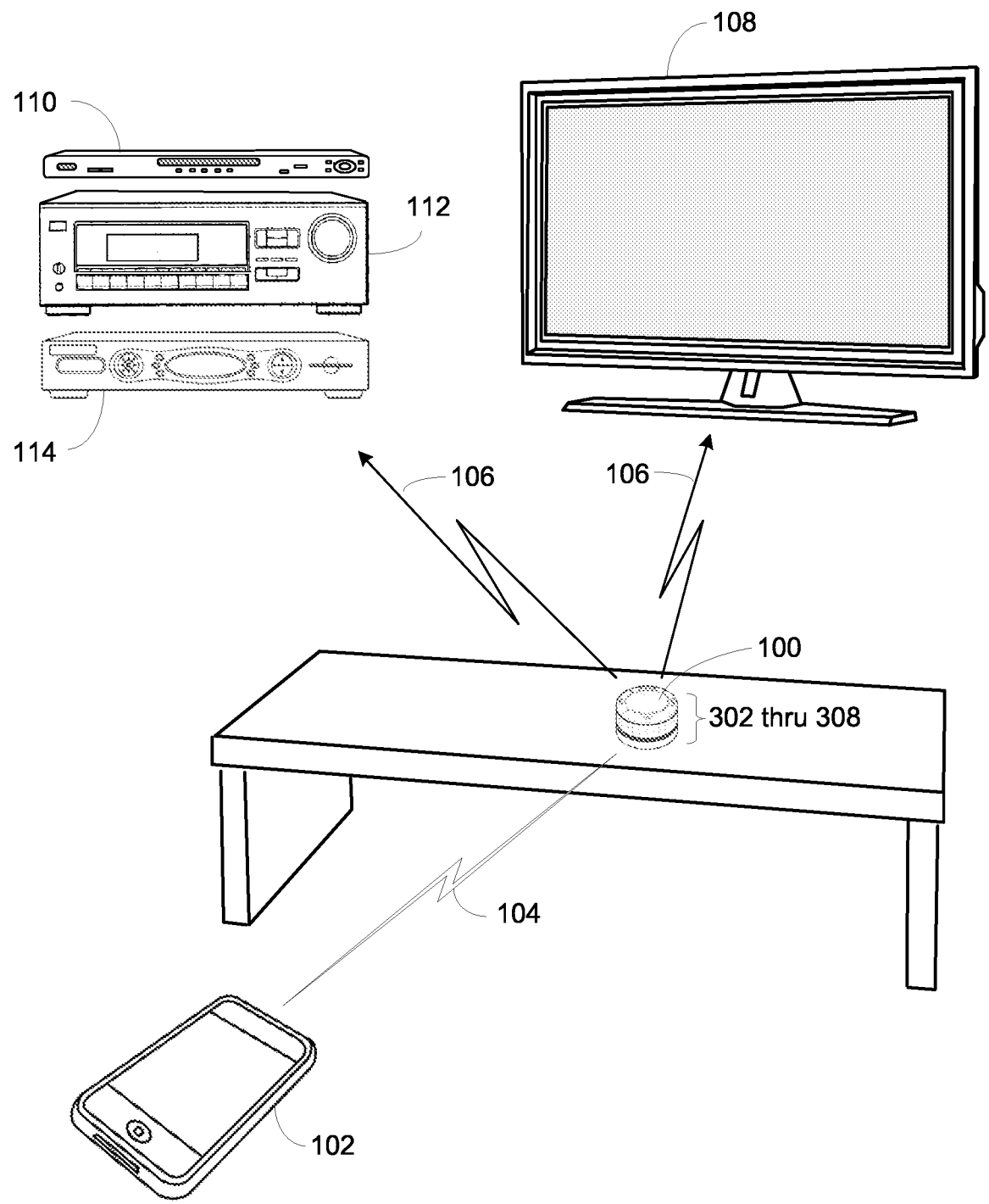
FIG. 1 illustrates an exemplary system in which an exemplary bridge device in accordance with the instant invention may be used alone and/or in conjunction with a smart device as a controlling device.

Turning now to FIG. 1, there is illustrated an exemplary system in which a smart device, such as a smart phone 102, may be adapted to control various controllable appliances, such as a television 108, a cable set top box combined with a digital video recorder ("DVR") 114, an AV receiver 112, and a DVD payer 110. Transmission of commands to the appliances may be facilitated by a combination command input and bridge device 100, which when functioning as a bridge device may receive wireless signals 104 from an app resident in smart phone 102 and convert these to appropriate infrared ("IR") signals 106 recognizable by the target appliances, and when functioning as a command input device may accept user mechanical input via one or more knobs or switches and likewise convert these inputs to appropriate IR signals 106; all to cause the appliances to perform one or more operational functions. While illustrated in the context of a television 108, DVR 114, AV receiver 112, and DVD player 110 it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. Also, while illustrated in the context of IR command transmissions, it will be appreciated that in general, command transmissions by bridge device 100 may take the form of any convenient IR, RF, hardwired, point-to-point, or networked protocol, as necessary to cause the respective target appliances to perform the desired operational functions. Further, while communications 104, 106, etc., between exemplary devices are illustrated herein as direct links, it should be appreciated that in many instances such communication may take place via a local area network or personal area network, and as such may involve various intermediary devices such as routers, access points, etc. Since these items are not necessary for an understanding of the instant invention, they are omitted from the Figures for the sake of clarity.

Figure 2:
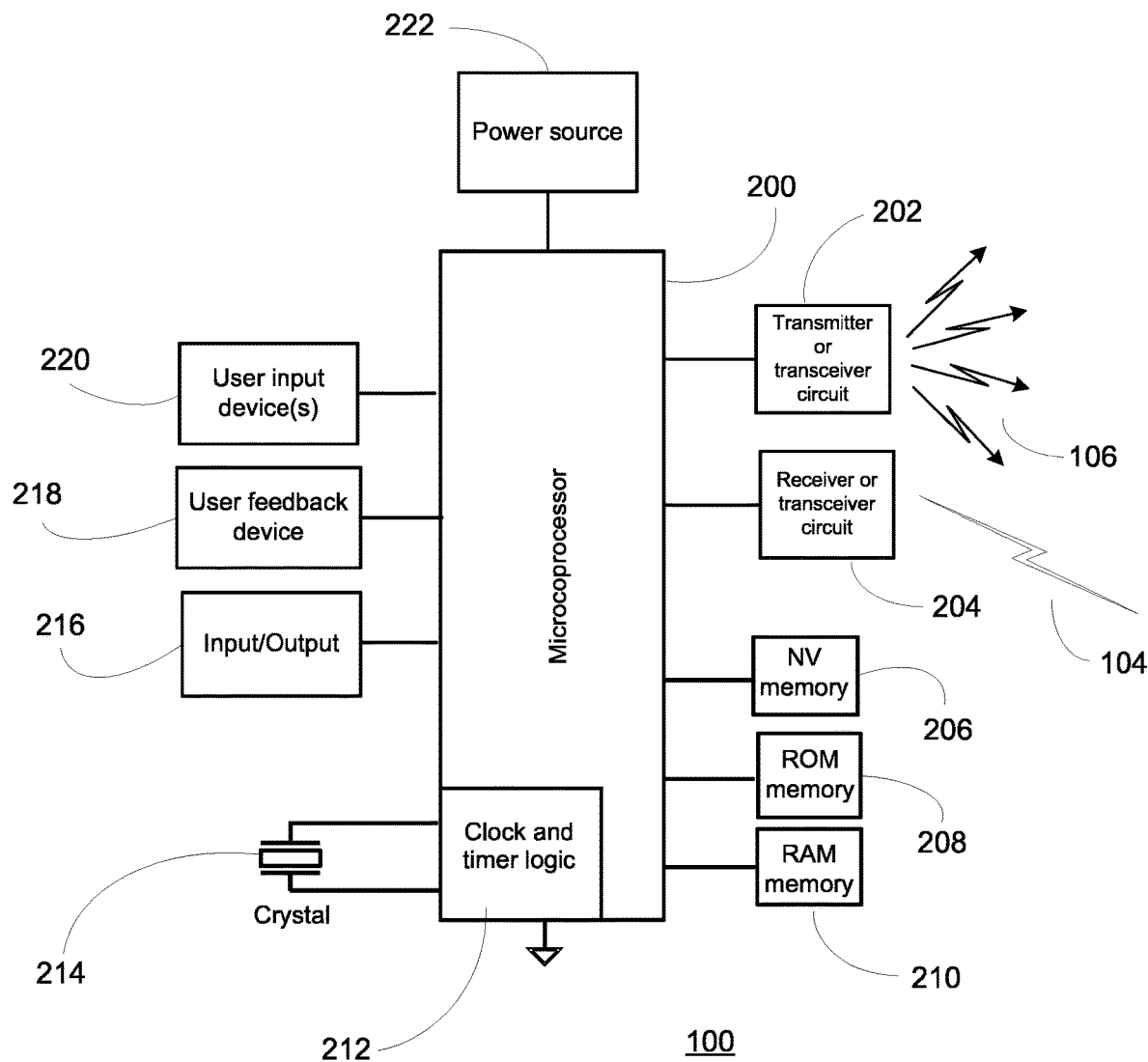
FIG. 2 illustrates in block diagram form the major components of the exemplary bridge device of FIGS. 1 and 3.

With reference to FIG. 2, for use in commanding the functional operations of one or more appliances, an exemplary bridge device 100 may include, as needed for a particular application, a processor 200 coupled to a ROM memory 208; a RAM memory 210; a non-volatile read/write memory 206; user input means 220 such as hard keys, soft keys on a touch sensitive surface, knobs, sliders, etc.; transmission circuit(s) and/or transceiver circuit(s) 202 (e.g., IR and/or RF) for issuance of commands to controlled appliances; receiver and/or transceiver circuit(s) 204 for receipt of command requests, e.g., from a smart phone 102; means 218 to provide feedback to the user (e.g., one or more LEDs, illuminable keys, display, speaker, and/or the like); an input/output port 216 such as a serial interface, USB port, modem, Zigbee, WiFi, or Bluetooth transceiver, etc.; a power source 222 such as a battery or a mains power adapter; and clock and timer logic 212 with associated crystal or resonator 214.

As will be understood by those skilled in the art, some or all of the non-transient, physically embodied memories 206, 208, 210 may include executable instructions (collectively, the bridge device program memory) that are intended to be executed by the processor 200 to control the operation of the bridge device 100, as well as data which serves to define the necessary control protocols and command values for use in transmitting command signals to controllable appliances (collectively, the command data). In this manner, the processor 200 may be programmed to control the various electronic components within the controlling device 100, e.g., to monitor the input means 220 and request receiver 204, to cause the transmission of appliance command signals, etc. The non-volatile read/write memory 206, for example an EEPROM, battery-backed up RAM, FLASH, Smart Card, memory stick, or the like, may additionally be provided to store setup data and parameters as necessary. While the memory 208 is illustrated and described as a ROM memory, memory 208 can also be comprised of any type of readable media, such as ROM, FLASH, EEPROM, or the like. Preferably, the memories 206 and 208 are non-volatile or battery-backed such that data is not required to be reloaded after battery changes. In addition, the memories 206, 208 and 210 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 206 and 208 respectively), and/or may be physically incorporated within the same IC chip as the microprocessor 200 (a so called "microcontroller") and, as such, they are shown separately in FIG. 2 only for the sake of clarity.

To cause the bridge device 100 to perform an action, the bridge device 100 may be adapted to be responsive to events, such as a sensed user interaction with input means 220, receipt of a request from a smart phone 102, etc. In response to an event, appropriate instructions within the program memory (hereafter the "bridge device operating program") may be executed. For example, when a command request is received from a smart phone 102, the bridge device 100 may retrieve from the command data stored in memory 206, 208, 210 a command value and control protocol corresponding to the requested function and device and transmit that command to an intended target appliance, e.g., TV 108, in a format recognizable by that appliance to thereby control one or more functional operations of that appliance.

Bridge device 100 may comprise a universal controller, that is a device provisioned with a command data library which encompasses a multiplicity of command codes and protocols suitable for controlling appliances of various different model and manufacture. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In all such cases, for selecting sets of command data to be associated with the specific appliances to be controlled (hereafter referred to as a setup procedure), data may be provided to the bridge device 100 that serves to identify each intended target appliance by its make, and/or model, and/or type. Such setup data allows the bridge device 100 to identify the appropriate command data set within the library of command data that is to be used to transmit recognizable commands in formats appropriate for such identified appliances.

The setup procedure for an illustrative bridge device 100 may comprise any method appropriate for a particular embodiment. For example, a setup procedure may entail one or more of: manipulating user input means 220 such as activating pre-defined combinations of buttons or other controls; performing configuration selection using an external system such as a PC or DVR 114 and downloading the resultant setup data to bridge device 100 via, for example, a USB port 216 or wirelessly via a WiFi or Bluetooth transceiver 204; executing a setup app on smart phone 102 and wirelessly transferring setup data as above; etc. Additionally, in some embodiments all or part of the required command data library may be downloaded into bridge device 100 as part of the set up process, originating for example from a local database resident in DVR 114 or smart phone 102 (i.e., stored in conjunction with a smart phone app), or from a remote Internet server based database accessed either directly by bridge device 100 or by using DVR 114 or smart phone 102 as an intermediary. Further, PC, DVR or smart phone based set up application processes may be local, Web server based, or a combination thereof as appropriate for a particular embodiment. Since systems and methods for setting up a universal controlling device to command the operation of specific home appliances are well-known, these will not be described in greater detail herein. Nevertheless, for additional information pertaining to setup procedures, the reader may turn, for example, to U.S. Pat. Nos. 4,959,810, 5,872,562, 7,653,212, or 7,612,685, all of which are incorporated herein by reference in their entirety.

Figure 3:
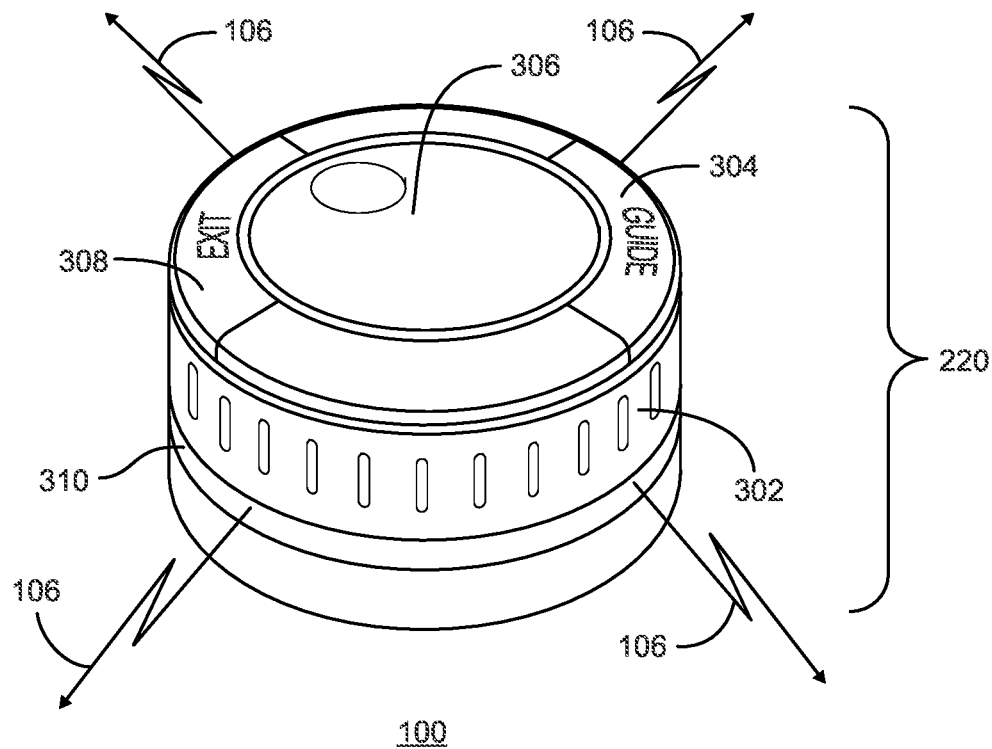
FIG. 3 further illustrates the exemplary bridge device of FIG. 1.
Figure 3:
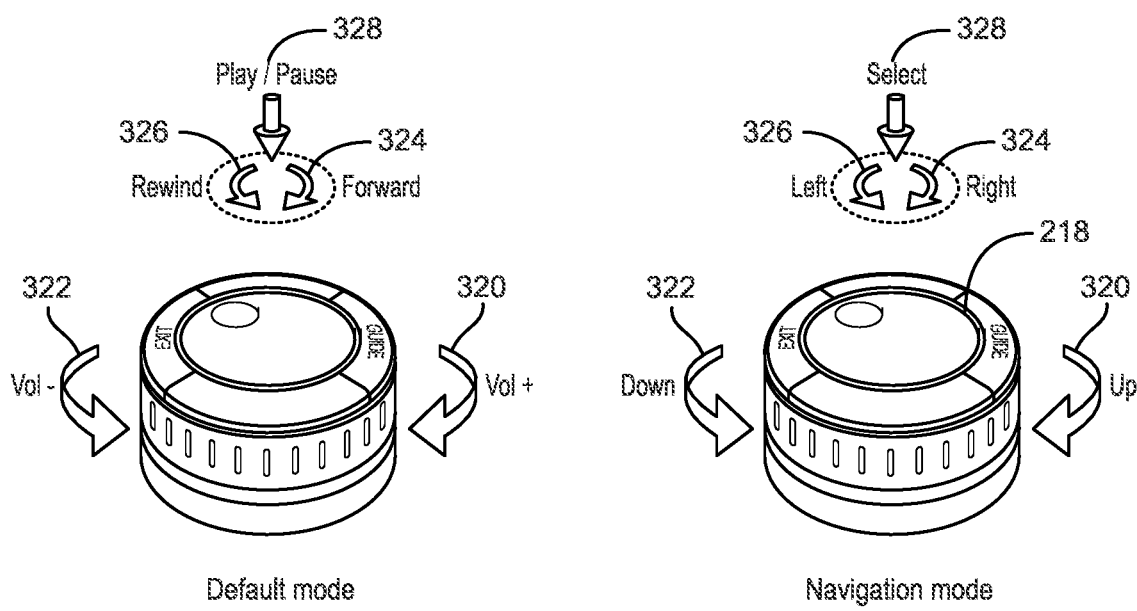

As is known in the art, the bridge device operating program may be adapted to monitor wireless receiver circuit 204 for command request messages originating from a smart phone 102. Upon receipt of such a request, the bridge device operating program may retrieve from the command data stored in memory a command value and control protocol corresponding to the requested function and the identified device and may cause transmitter circuit 202 to output that command in a format recognizable by the target appliance. In accordance with the instant invention, an exemplary bridge device may additionally include means for direct user input on the device itself and further operating programming to monitor such input(s) 220 and output appliance commands in response thereto. With reference now FIG. 3, an illustrative bridge device 100 in accordance with the instant invention may include on its external surface various means for user input comprising buttons 304, 308, a twistable ring 302, and a rotatable wheel 306 which wheel may also function as a button or switch when depressed. In this manner seven distinct user inputs may be supported: three buttons presses, clockwise and anticlockwise ring twists, and clockwise and anticlockwise wheel rotations. As will be appreciated, many other configurations of input mechanisms are possible and accordingly the example presented in FIG. 3 is intended to be illustrative and not limiting. As shown, the exemplary bridge device 100 of FIG. 3 may include multiple IR transmitters arranged around the periphery of bridge device 100 so as to radiate IR signals 106 in multiple different directions, e.g., positioned at 180 degree or 90 degree or 45 degree intervals about the device, thus ensuring that command transmissions are visible to the target appliance(s) regardless of the orientation of bridge device 100. In the illustrative embodiment, for aesthetic reasons and/or for mechanical protection such transmitters may be positioned behind an IR-transparent lens 310 of tinted polycarbonate or acrylic plastic.

In the illustrative embodiment, the operating program of bridge device 100 may comprise two modes for acceptance of direct user interaction: In a default mode of operation, clockwise and anti-clockwise twists 320,322 of outer ring 302 may result in transmission of volume up/down commands to TV 108, while clockwise and anti-clockwise rotations 324,326 of wheel 306 may result in transmission of forward/rewind commands to DVR 114 and depression 328a of wheel 306 may result in transmission of a play/pause command to DVR 114. In this embodiment, activation of button 304 may result in both the transmission of a command to DVR 114 to cause a display of program guide information by DVR 114 and setting bridge device operating program to a navigation mode, wherein user interactions 320 through 328 with ring 302 or wheel 306 may result in transmission of DVR 114 program guide navigation commands up/down, left/right, and select. Activation of either the "select" function 328 of wheel 306 or the "Exit" button 308 may cause transmission of an appropriate command to DVR 114 together with restoration of the bridge device operating program to the default mode. In this manner, the direct commands currently available to a user of the bridge device 100 may be automatically adapted as appropriate to the operational status of a controlled device such as DVR 114. In some embodiments the current operational mode of bridge device 100 may be indicated the user via, for example, a user feedback device 218 comprising an illuminable translucent ring surrounding wheel 306. It will be appreciated that in various embodiments such bridge device mode switching functionality may be supported or supplemented via other means: for example one or more of the controlled devices may communicate current system status directly to bridge device 100, e.g., DVR 114 may indicate a current operational status; TV 108 may indicate a currently selected input to bridge device 100 to allow automatic selection of DVR 114 or DVD 110 at the target appliance for play/pause commands; an app loaded in smart phone 102 may signal a preferred operational mode to a bridge device; etc.

Figure 4:
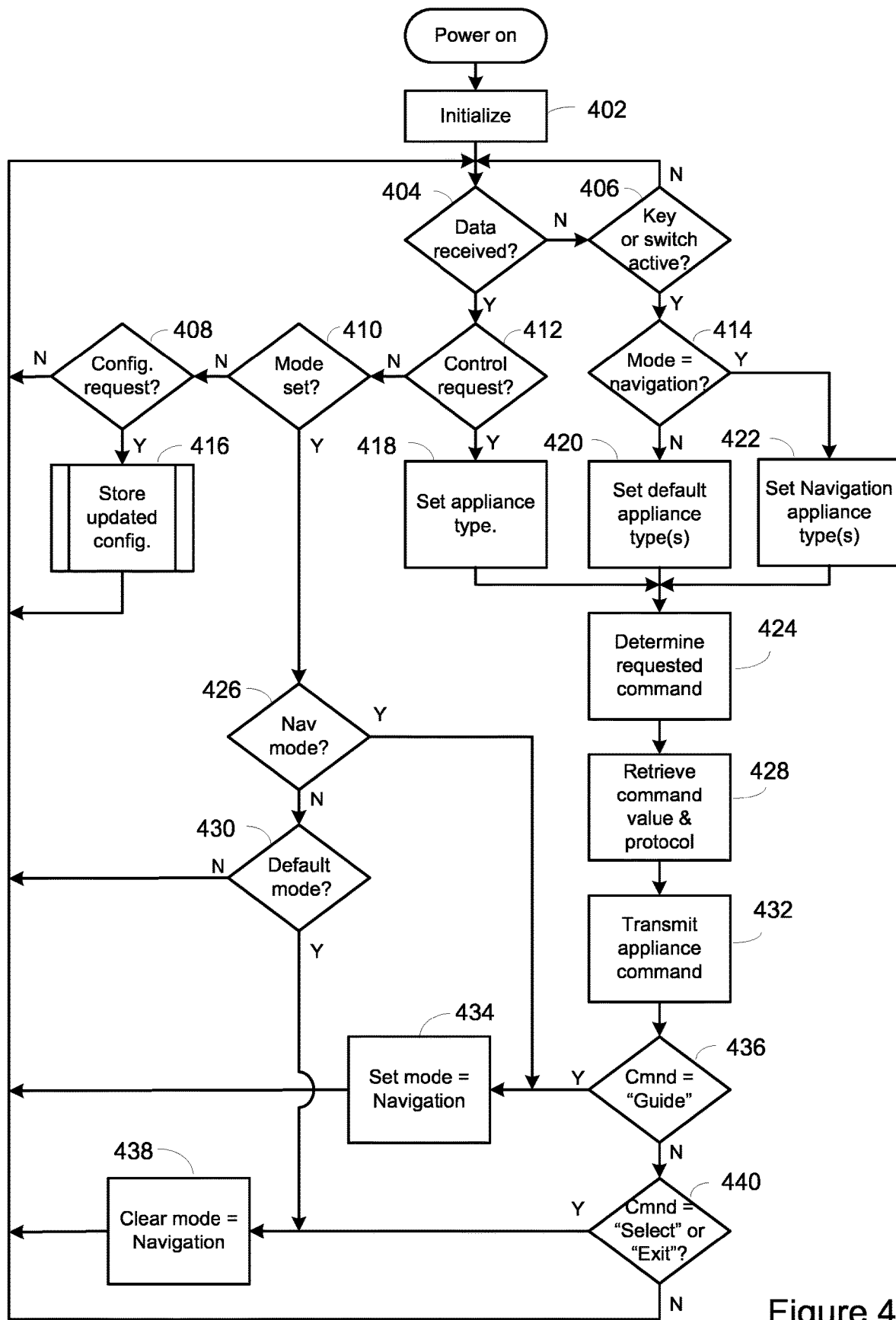
FIG. 4 illustrates an exemplary operational flow as may be implemented in one embodiment of the bridge device of FIGS. 1, 2 and 3.

By way of further example, a series of steps which may be performed by an exemplary bridge device operating program is illustrated in FIG. 4. Upon initial power-up, at step 402 the bridge device operating program may place bridge device 100 into a known initial state, which may include in the example presented setting the initial operational mode to a default value. Thereafter, at steps 404,406 the exemplary bridge device operating program may commence scanning receiver 204 and user input devices 206 (i.e., 302 through 308) for activity. As will be appreciated, in certain embodiments, particularly those in which a bridge device power source 222 is battery-based, such input scanning may not entail active execution of program instructions but may rather comprise placing microprocessor 200 into a low power state pending a wake up interrupt from one or more of these input sources. If user interaction with any of input devices 302 through 308 is detected, at step 414 the exemplary bridge device operating program may first determine the current operating mode of the bridge device, i.e., navigation mode or default mode as described above in connection with FIG. 3. According to this determination, at steps 420 or 422 the appropriate target appliances may be set. For example, as described earlier in conjunction with FIG. 3 if bridge device 100 is operating in default mode the target appliance for ring rotations 320,322 may be TV 108, while if bridge device 100 is operating in navigation mode the target appliance for the same user actions may be DVR 114. As will be appreciated, the exact assignment of appliances to particular modes and to specific user interactions may be configurable and/or dynamic (assigned for example by interaction with appliances themselves to determine which are currently active) and as such, the assignments mentioned herein are by way of example only and not limiting.

Once a target appliance has been determined, at steps 424, 428 and 432 the exemplary bridge device operating program may next determine the desired command (i.e., the action to be performed by the target appliance), retrieve from command data storage the appropriate command value and control protocol for the selected target appliance, and transmit the command in a format recognizable by the appliance to be controlled. Upon completion of these steps, at step 436 the exemplary bridge device operating program may next determine if the command transmitted comprised a "Guide" command (i.e. corresponding to button 304). If so at step 434 the bridge device operational mode is set to "Navigation", thus ensuring that subsequent user interactions with inputs 302 through 308 will be directed to the appliance(s) configured for this mode of operation. If not, at step 440 it is next determined if the command just transmitted was either of "Select" or "Exit" in which case, in keeping with the methodology described above in conjunction with FIG. 3, at step 438 the bridge device operational mode is returned to "Default". Thereafter, processing of the event is complete and receiver and input scanning is resumed.

If receipt of a transmission by receiver 204 is detected, at step 412 the exemplary bridge device operating program may determine if the received transmission comprises an appliance control request, for example from smart phone 102. If so, at step 418 the target appliance type is set as indicated in the received request, and thereafter processing continues at step 424 as described previously. If the received transmission is not a control request, at step 410 it is next determined if this comprises a request to alter the bridge device mode of operation (i.e. the response to user interactions with inputs 302 through 308). This may occur, for example, in embodiments where an appliance such as DVR 114 may explicitly signal operational state to the bridge device. If it is determined that a request to place the bridge device into a specific mode has been received, then appropriate action may be taken by the exemplary bridge device operating program at steps 426 and 430.

Finally, at step 408 it is determined if the received transmission comprises updated bridge device configuration data, such as may for example have been created via a set up app on smart phone 102, a PC or STB based configurator, etc. If so, at step 416 the updated configuration data is stored, for example in non-volatile memory 206, whereafter input event scanning resumes at steps 404 and 406.

Figure 5:
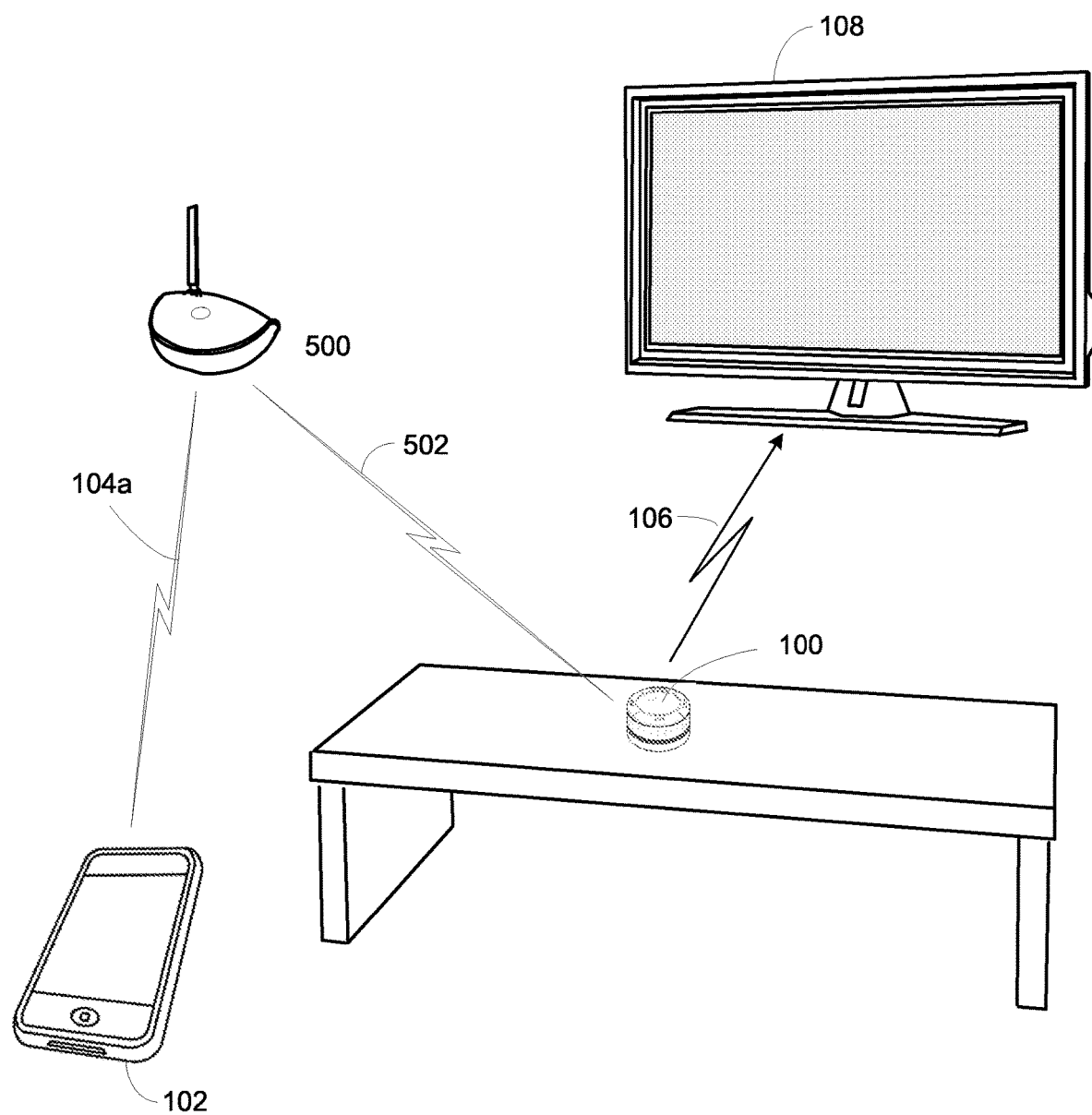
FIG. 5 illustrates a system incorporating an exemplary alternate embodiment of a bridge device in accordance with the instant invention.

With reference to FIG. 5, in certain cases a bridge device 100 may not have a wireless communication protocol in common with smart phone 102, for example and without limitation bridge device 100 may support only RF4CE and/or Bluetooth communication while smart phone 102 supports only WiFi local communication. In such instances, an intermediary device 500 may serve to receive wireless signals 104a comprising command requests from smart phone 102 and retransmit these command requests in a format which is compatible with a communication protocol supported by bridge device 100. As will be appreciated, though illustrated in the form of wireless transmission 502, in general such retransmission may take any form appropriate for a particular embodiment of bridge device 100: RF, IR, ultrasonic, hardwired, etc. Also, the functionality of intermediary device 500 may reside in a standalone unit provisioned expressly for this purpose, or may be incorporated in some other item of equipment, for example DVR 114.

Figure 6:
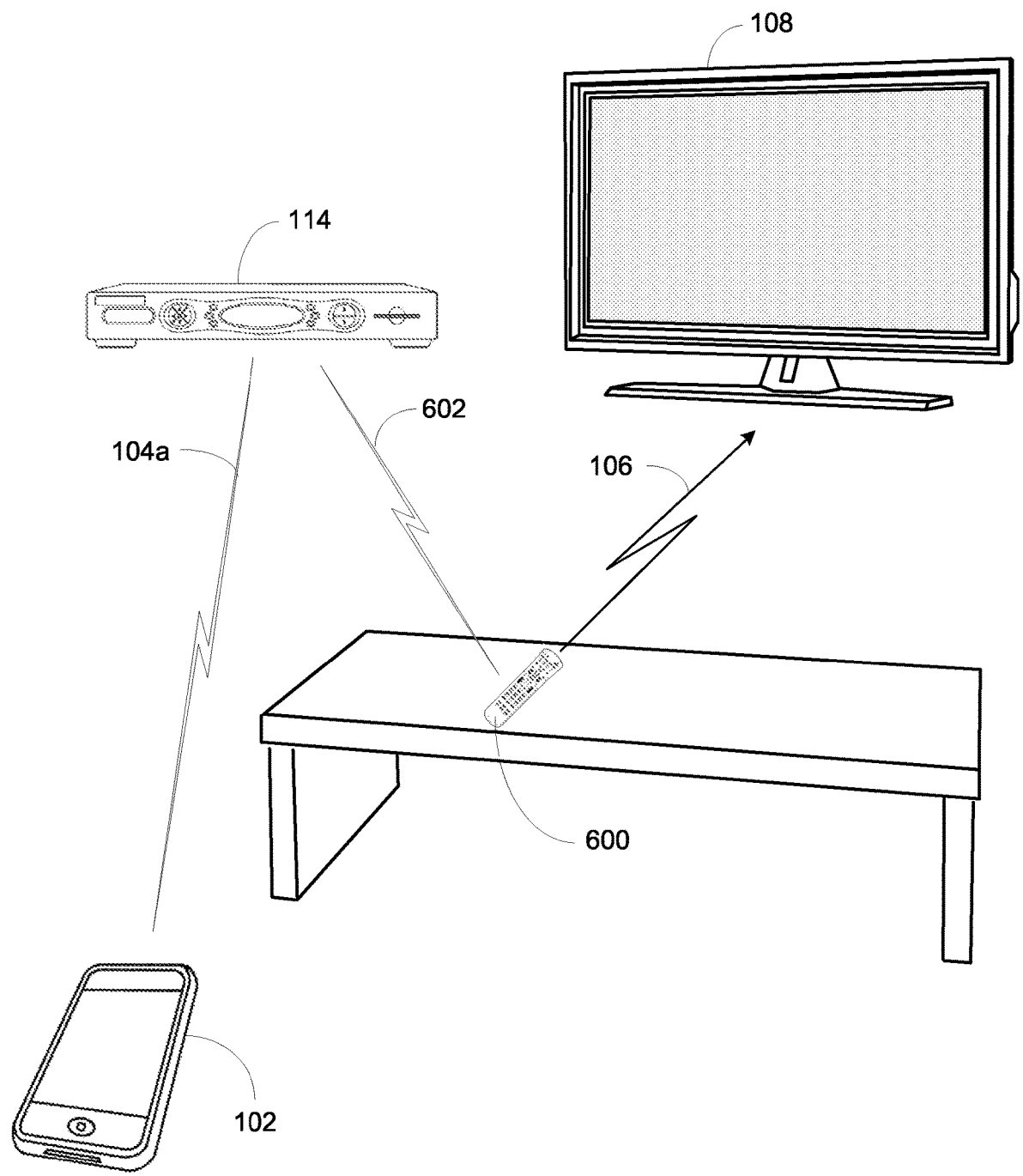
FIG. 6 illustrates a system incorporating a yet further exemplary alternate embodiment of a bridge device in accordance with the instant invention.

As illustrated in FIG. 6, in a yet further embodiment a remote control 600 which is capable of two-way communication 602 with a STB or DVR 114 via any convenient protocol such as for example RF4CE or XMP may also serve as a bridge device when equipped with appropriate programming. In such an application, STB or DVR 114 may act as an intermediary device in a similar manner to that described above, receiving command requests from smart phone 102 and relaying these to remote control 600 via two-way communication link 602. Programming in remote control 600 may perform as previously described to translate the received requests into command transmissions 106 in a format recognizable by an appliance to be controlled, for example TV 108. In some embodiments, the remote control 600 may be adapted to be placed into a recharging station. Such a remote control 600 may then be limited to serving as a bridge only when the remote control 600 is sensed to be placed into the docking station. Further, the docking station could be provided with the circuitry need to receive signals from an intermediary device with the docking station then functioning to relay any signals so received to a docked remote control 600, for example, transmitted via the charging contacts.

While various concepts have been described in detail, it will be appreciated by those skilled in the art that various modifications and alternatives to those concepts could be developed in light of the overall teachings of the disclosure. For example, in an alternate embodiment, a bridge device may be incorporated into some other item of equipment, for example a smart phone charging base, a portable keyboard or game controller device, a table lamp, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, memory device having stored thereon instructions which instructions, when executed by a controlling device, cause the controlling device to respond to a communication received from a first controllable device by automatically transitioning the controlling device from a default command transmitting operational mode to a navigational command transmitting operational mode and to respond to a subsequently sensed event by transmitting to a second controllable device via use of a transmitting device of the controlling device a navigational select command to cause a media access device to commence a rendering on the first controllable device a media selected by use of the transmitted navigational select command and by automatically transitioning the controlling device from the navigational command transmitting operational mode back to the default command transmitting operational mode.

2. The non-transitory, memory device as recited in claim 1, wherein the default command transmitting operational mode comprises a mode for controlling at least volume operations of the first controllable device.

3. The non-transitory, memory device as recited in claim 1, wherein the communication received from the first controllable device comprises a data indicative of a state of the first controllable device.

4. The non-transitory, memory device as recited in claim 1, wherein the sensed event comprises a sensing of a second command being received from a further controlling device in communication with the controlling device.

5. The non-transitory, memory device as recited in claim 1, wherein the sensed event comprises a sensed user interaction with a select input element of the controlling device.

6. The non-transitory, memory device as recited in claim 1, wherein the instructions comprise a remote control application configured on the controlling device to communicate commands directly to the first controllable device and the media access device.

7. The non-transitory, memory device as recited in claim 6, wherein first controllable device comprise a television.

8. The non-transitory, memory device as recited in claim 1, wherein the transmitting device comprises an infrared signal transmitting device.

9. The non-transitory, memory device as recited in claim 1, wherein the transmitting device comprises a radio frequency signal transmitting device.

10. A method performed by a controlling device, comprising:
responding to a communication received from a first controllable device by automatically transitioning the controlling device from a default command transmitting operational mode to a navigational command transmitting operational mode; and
responding to a subsequently sensed event by transmitting to a second controllable device via use of a transmitting device of the controlling device a navigational select command to cause a media access device to commence a rendering on the first controllable device a media selected by use of the transmitted navigational select command and by automatically transitioning the controlling device from the navigational command transmitting operational mode back to the default command transmitting operational mode.

11. The method as recited in claim 10, wherein the sensed event comprises a sensing of a second command being received from a further controlling device in communication with the controlling device.

12. The method as recited in claim 10, wherein the default command transmitting operational mode comprises a mode for controlling at least volume operations of the first controllable device.

13. The method as recited in claim 10, wherein the communication received from the first controllable device comprises a data indicative of a state of the first controllable device.

14. The method as recited in claim 10, wherein the transmitting device comprises a radio frequency signal transmitting device.

15. The method as recited in claim 10, wherein the sensed event comprises a sensed user interaction with a select input element of the controlling device.

16. The method as recited in claim 10, wherein the instructions comprise a remote control application configured on the controlling device to communicate commands directly to the first controllable device and the media access device.

17. The method as recited in claim 16, wherein first controllable device comprise a television.

18. The method as recited in claim 10, wherein the transmitting device comprises an infrared signal transmitting device.

* * * * *